United States Patent [19]
Drewery

[11] Patent Number: 5,770,071
[45] Date of Patent: *Jun. 23, 1998

[54] SAND FILTER FOR A WASTEWATER EFFLUENT MANAGEMENT SYSTEM

[76] Inventor: T. Gig Drewery, P.O. Box 426, Kountze, Tex. 77625-0426

[ * ] Notice: The term of this patent shall not extend beyond the expiration date of Pat. No. 5,536,404.

[21] Appl. No.: 680,498

[22] Filed: Jul. 15, 1996

Related U.S. Application Data

[63] Continuation-in-part of Ser. No. 133,645, Oct. 8, 1993, Pat. No. 5,536,404.
[51] Int. Cl.⁶ .................................................. B01D 24/42
[52] U.S. Cl. ............................................................. 210/289
[58] Field of Search .................................. 210/263, 289, 210/291, 282

[56] References Cited

U.S. PATENT DOCUMENTS

| 4,107,046 | 8/1978 | Corder | 210/289 |
| 4,769,144 | 9/1988 | Nohren | 210/282 |
| 5,068,033 | 11/1991 | Tobias et al. | 210/291 |

*Primary Examiner*—Ivars Cintins
*Attorney, Agent, or Firm*—Harrison & Egbert

[57] ABSTRACT

A wastewater filter having a fluid inlet, a fluid outlet, a first body portion connected to the fluid inlet, a second body portion connected to the first body portion, a filter support disposed in the second body portion between the first body portion and the fluid outlet, and a particulate filter material filling an area between the second body portion and the filter support and extending into the first body portion. The filter support has a plurality of openings formed therein. The total area of the plurality of openings is greater than a horizontal cross-sectional area of the particulate filter material in the first body portion. The particulate filter material filters wastewater passing therethrough.

24 Claims, 6 Drawing Sheets

SAND FILTER FOR A WASTEWATER EFFLUENT MANAGEMENT SYSTEM

RELATED APPLICATIONS

The present application is a continuation-in-part of U.S. patent application Ser. No. 08/133,645, filed on Oct. 8, 1993, and entitled "WASTEWATER EFFLUENT MANAGEMENT SYSTEM USING A SAND FILTER" which will issue as U.S. Pat. No. 5,536,404 on Jul. 16, 1996.

TECHNICAL FIELD

The present invention relates to apparatus and methods for the filtering and control of wastewater effluent. More particularly, the present invention relates to wastewater filters and, more specifically, to sand-type filters.

BACKGROUND ART

In recent years, there has been a great deal of effort devoted to the management of household, commercial, and marine wastewater effluent. In many situations, in the past, households have used septic tanks with conventional drainfields for the treatment and disposal of wastewater. Similarly, in relatively remote areas, it is common for businesses to utilize such septic tanks for the disposal of wastewater. After the wastewater has been accumulated in a septic tank, it is commonly removed by tank trucks passing periodically through the area.

Fortunately, the era of the septic tank drainfield system being used indiscriminantly is slowly disappearing. Presently, there are several household and commercial wastewater treatment systems that are presently on the market. These systems are designed to serve homes and small commercial establishments outside the reach of a city sewer. These systems utilize a similar treatment process as used by most large central treatment plants. One such system is identified as a HYDRO-FLO™ wastewater treatment system. This HYDRO-FLO™ system is a self-contained, automatic system. This system essentially aerates the raw wastewater and mixes the wastewater with activated sludge. Aerobic bacteria use the oxygen, from the aeration process, to break down the wastewater so as to convert it into odorless liquids and gases. This HYDRO-FLO™ system is presently sold by Hydro-Flo wastewater Treatment Systems, Inc. of Kountze, Tex.

In many circumstances, the discharge from such household wastewater treatment systems is suitable for disposal into underground drainfields or for surface disposal. Unfortunately, in a wide variety of other situations, the discharge of such household wastewater treatment systems is considered unsatisfactory for irrigation purposes and, in particular, for drip irrigation systems. Ideally, it is desirable to reuse the household wastewater on the lawn or landscape. Drip irrigation has been found to be a particularly effective manner in which to irrigate.

The main reason why the household wastewater treatment systems are inadequate for irrigation purposes is the fact that periodically the effluent contains relatively large biological particles therein. Efforts have been made, in the past, so as to filter the effluent discharge from these household wastewater treatment systems. Under limited circumstances, conventional screen and/or disk filter arrangements can effectively remove the large particles from the effluent discharge. The large particles must be removed so as to prevent clogging of the drip irrigation lines and to prevent clogging of the orifices of spray irrigation systems.

It has been found that these conventional filter arrangements have proven inadequate in continuous usage. In virtually all circumstances, these screen and disk filters will be quickly and easily clogged with the biological effluent discharge material. As soon as these filters are clogged, the entire wastewater treatment system, and discharge system, are rendered inoperable. Under certain circumstances, backflushing techniques have been employed in an effort to avoid the clogging of the filters. Unfortunately, disk and screen type filters have not responded well to backflushing. If the household wastewater treatment system is used for home irrigation purposes, then the effluent in a large number of cases must be filtered. Under conventional applications, these filters have required replacement, repair, and continual attention so as to enable the system to function properly. None of the prior applications, in the past, have found practicality as a continuous system for the irrigating of land.

In many remote locations, it is very difficult to obtain enough water for the continual operation of toilets and/or commodes. Under certain circumstances, treated effluent can be recycled for use in the storage tank of a toilet. Since the water stored in the storage tank of a toilet is not consumed, then the treated effluent is particularly suitable for use in the storage tank. Unfortunately, with regard to small wastewater flows, efforts in the past have not been directed so as to utilize the treated effluent in the storage tank of a toilet.

In many areas it will be desirable to use the wastewater effluent management system to protect the environment when using direct discharge or the drainfield as the effluent disposal method.

In the past, a large variety of water filters have been patented. For example, U.S. Pat. No. 616,031, issued on Dec. 13, 1898 describes a siphon carbon faucet filter. This filter is interconnected to a faucet for the purpose of removing particles from the water of the faucet. An activated charcoal material is maintained within a compartment in fluid communication with the outlet of the faucet. As the water passes through the carbon filter, the particles and impurities are effectively removed from the water.

U.S. Pat. No. 1,979,197, issued on Oct. 30, 1934 to A. Harf discloses a filter which includes a tank filled with a charcoal material. The tank has an inlet, for receiving water, and an outlet for passing filtered water therefrom. The tank is divided into compartments for the accumulation of the water.

U.S. Pat. No. 1,326,374, issued on Dec. 30, 1919 teaches a water filter that has a layered arrangement of sand, gravel, charcoal and furnace slag. Water is delivered to this layered arrangement of filter materials from an inlet. The filtered water will then pass outwardly of a tank from an outlet at the bottom of the tank.

U.S. Pat. No. 2,742,156, issued on Apr. 17, 1956, to E. G. Spangler teaches a liquid purifying separator having a hollow fluid passing shell, a filter chamber contained within and spaced from a side wall of the shell, and a means for passing fluid downwardly through the chamber to pass out a lower portion of the chamber. A mass of filter material is located within the inner chamber for separating entrainment from the fluid to fall downwardly from the chamber toward a bottom shell outlet. In particular, this mass of filter material includes wood shavings.

U.S. Pat. No. 2,997,178, issued on Aug. 22, 1961, to W. Lorimer provides a water filter that has a supporting head disposed to be tapped into the pipe carrying the water to be filtered. A primary screen filter removes any relatively coarse particles from the water. A means is provided for supporting a bed of loose filtering material. A distribution system is provided so as to cause the water to be passed over the bed and to cause it to pass in forward and return directions through the filtering body before being released for consumption.

U.S. Pat. No. 3,126,335, issued on Mar. 24, 1964, to W. E. Stipe provides a water softener which is a tubular member having an inlet at one end and an outlet at an opposite end. The pipe is provided with a bed of gravel and the remainder is filled with a filler of granular zeolite or resin beads, charged with sodium ions. As raw water flows downwardly through the filter in the pipe, there occurs an ion exchange between the calcium in the water and the sodium-charged filler.

U.S. Pat. No. 3,710,944, issued on Jan. 16, 1973, to H. E. Budeshein describes a water filter for filtering water contained suspended mechanical impurities and also chemical impurities. This filter first passes the water through a mechanical filter, which traps the mechanical impurities, and then passes the water through a chemical filter, which removes the chemical impurities. The device includes a generally cylindrical housing in which is mounted a sleeve of a rigid water pervious filter medium. One end of the housing opens into one end of the filter. A container containing a chemical agent capable of removing the chemical impurities is in communication with the interior of the housing.

U.S. Pat. No. 5,116,502, issued on May 26, 1992, to G. E. Ferguson describes a horizontal countertop water filter. This water filter has a horizontal housing defining a fluid inlet channel and a fluid filtration chamber. The water filter is fitted with a diverter valve and a fluid conduit which conducts diverted fluid from the sink faucet into the water filter.

Soviet Patent No. 1584-984-A teaches a water filtering unit which has a floating charge made of granules of lower density than water. A water supply pipe is placed tangentially to the body outer surface. The water is supplied under pressure to the body which is prefilled with water. The water passes through a pipe and is swirled in the body's cylindrical part. Due to the centrifugal force, the suspension is separated and is concentrated in the sediment in the body's conical part.

It is an object of the present invention to provide a filter that can be effectively backflushed during continual operations.

It is another object of the present invention to provide a filter that effectively removes particles of greater than one hundred microns.

It is another object of the present invention to provide a wastewater filter that is easy to use, easy to maintain, relatively inexpensive, and easily monitored.

These and other objects and advantages of the present invention will become apparent from a reading of the attached specification and appended claims.

SUMMARY OF THE INVENTION

The present invention is a wastewater filter that comprises a fluid inlet, a fluid outlet, a first body portion connected to the fluid inlet, a second body portion connected to the first body portion, a filter support disposed in the second body portion between the first body portion and the fluid outlet, and a particulate filter material filling an area between the second body portion and the filter support and extending into the first body portion. The filter support has a plurality of openings formed therein. The particulate filter material serves to filter wastewater passing through the filter. The openings in the filter support has a total surface area which is greater than a cross-sectional area of the particulate filter material in the first body portion.

In a preferred embodiment of the present invention, the first body portion is in communication with and extends transversely to the second body portion. The first body portion extends vertically above the second body portion. The second body portion extends horizontally. The fluid inlet is positioned at an end of the first body portion. The fluid outlet is positioned at an end of the second body portion. The particulate filter material extends for less than a height of the first body portion. The particulate filter material extends continuously from the second body portion to the first body portion.

The filter support in this preferred embodiment is a tubular member which extends from the fluid outlet into the second body portion. The openings in the filter support are slits formed in the tubular member. The slits are formed on the tubular member transverse to a longitudinal axis of the tubular member. Each of the slits has a width less than a diameter of a particle of the particulate filter material. The tubular member has a length less than a length of the second body portion. The particulate filter material fills a volume of the second body portion exterior of the tubular member. The particulate filter material is ideally sand (otherwise known as silica particles).

BRIEF DESCRIPTION OF THE DRAWINGS

FIG. 10 is a cross-sectional view of a sixth alternative embodiment of the present invention.

DETAILED DESCRIPTION OF THE INVENTION

Figure 1:
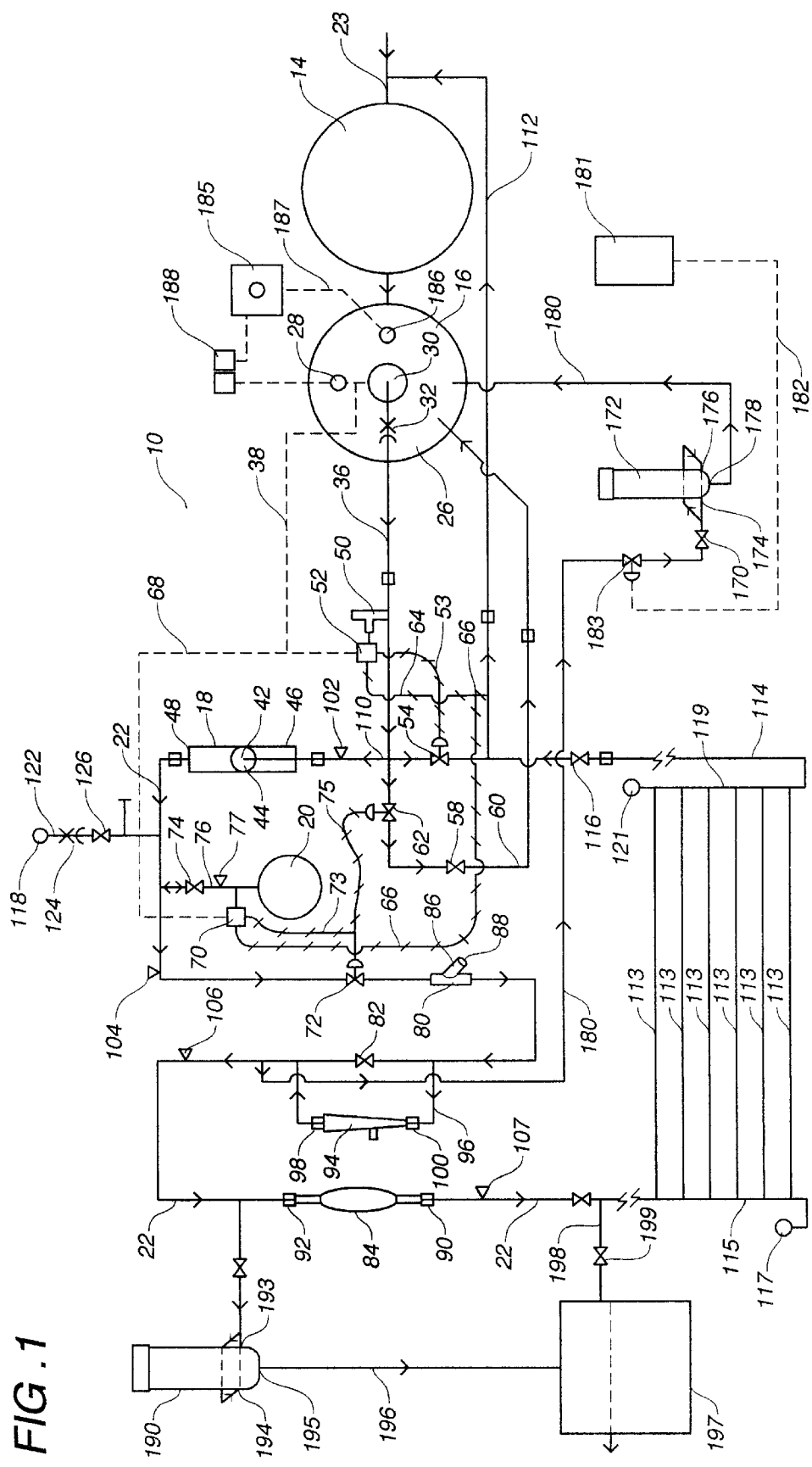
FIG. 1 is a schematic representation of a system for controlling effluent discharge which employs a sand filter as part of the system.

Referring to FIG. 1, there is shown at 10 a system for controlling effluent discharge which employs a sand filter 18 in accordance with the teachings of the present invention. The effluent discharge management system 10 includes a wastewater inlet 14, a pump system 16, a filter 18, a filtered water retaining chamber 20, a control means, and an outlet 22.

The wastewater inlet 14 is essentially a pretreatment tank. The pretreatment tank 14 can be a home wastewater treatment system. Specifically, the pretreatment tank 14 can be a wastewater treatment system, such as the HYDRO-FLO™ system described herein previously. The pretreatment tank 14 is to receive household (or commercial) wastewater through line 23. As the wastewater enters the pretreatment tank 14 through line 23, it is subject to an aeration process in which it is mixed with activated sludge. This aeration process serves to cause aerobic bacteria to break down the wastewater so as to convert it into an odorless liquid and gas. Essentially, the pretreatment tank 14 is the first step in the process of cleaning the wastewater for use in drip irrigation. After the pretreatment tank 14 has effectively received the wastewater through line 23, the pretreatment tank will accumulate the wastewater as it is being purified. Eventually, the wastewater from the pretreatment tank 14 will pass through line 24 into a wastewater tank 26.

As can be seen in FIG. 1, the wastewater tank 26 includes a float switch 28, a pump 30, and a valve 32. The wastewater tank 26 is shown as having a level of pretreated wastewater 34 therewithin. As the pretreated wastewater passes from the pretreatment tank 14 into the wastewater tank 26, the level of the wastewater 34 will actuate the float switch 28. When the wastewater 34 is at a low level, then the float switch 28 will also will be at a low level. As the wastewater lever 34 rises in the tank 26, the float switch 28 will also pivot and rise. When the float switch 28 has risen to a desired level, then the pump 30 will be activated so as to pass the pretreated wastewater 34 through the one way valve 32 and outwardly through conduit 36. It can be seen that the float switch 36 has electrical line 38 (shown in broken line fashion) connected thereto. As such, the activation of the pump 30 by the action of the float switch 28 will serve also to activate valves within the system 10.

As the pretreated wastewater is passed through the conduit 36, it follows a path until it is introduced into the inlet 42 of the filter 18. The filter 18 is a sand filter (to be described hereinafter in connection with FIGS. 2–11). The sand filter 18 includes a first body portion 44, a second body portion 46, and an outlet 48. A filter support is disposed within the filter 18 within the second body portion 46 between the first body portion 44 and the outlet 48. A particulate filter material fills a portion of the interior of the filter 18. This particulate filter material should have a quality so as to filter all material having size greater than 100 microns.

After the pretreated wastewater has passed through the conduit 36, and through the filter 18, it is passed outwardly at the filter 18 through the outlet 48 and into outlet conduit 22.

As the pretreated wastewater is passed through conduit 36, a portion of the wastewater will flow into a T-filter 50. The T-filter 50 is a screen filter that is suitable for filtering particles having a size of greater than 100 microns. The T-filter 50 is connected to a fluid actuated solenoid 52. As such, the arrangement of the T-filter 50 and the solenoid 52 serves as a controller 20 for the present invention, in conjunction with the arrangement of the pump system 16. The fluid-activated solenoid 52 serves to control a valve 54. A pressure line 53 extends between the solenoid 52 and the valve 54. When the float switch 28 is in its upper position, and the pump 30 is passing the pretreated effluent through the conduit 36, then the solenoid 52 will close the valve 54 (which is normally open). The electrical line 38 serves to control the solenoid 52 when the float switch 28 is in its uppermost position. A throttle valve 58 is provided along conduit 60. Conduit 60 is interconnected with the conduit 36. As the pretreated wastewater is being pumped through the conduit 36, a portion of the pretreated wastewater will flow into the filter 18 and another portion of the effluent will recirculate through the conduit 60 back into the wastewater tank 26. The amount of the pretreated wastewater which is circulated through the conduit 60 is controlled by the proper manipulation of the throttle valve 58. A control valve 62 is also provided on line 60. Control valve 62 will be opened whenever the valve 54 is closed and whenever the pump 30 is activated so as to pass the pretreated wastewater into the filter 18. Overloads of the pump 30 are effectively prevented by recycling the pretreated wastewater through the line 60. In the event of a failure of the filter 18, the effluent is simply recycled through conduit 60 back into the wastewater tank 16. The solenoid 52 is connected to a small line 64 which serves to vent the liquids from the solenoid 52 whenever the valve 54 is in its closed position. The vented liquids pass from the end of line 66 to the pretreatment line 112.

Importantly, the electrical line 38 extends along pathway 68 to a solenoid 70. A throttle valve 74 is provided along conduit 76 to the filtered water retaining chamber 20. The filtered water retaining chamber 20 is a captive air tank which is in valved communication with the filter 18 and with the outlet conduit 22. In normal operation, the captive air tank 20 has an interior bladder which is suitable for receiving a portion of the filtered wastewater therein. As the filtered effluent passes from the outlet 48 through the outlet conduit 22, the filtered effluent will pass, under pressure, through the throttle valve 74 into the captive air tank 20. Depending upon the pressure requirements of the system, the filtered effluent will fill the captive air tank 20 to a desired pressure (approximately 40 p.s.i.). When the captive air tank 20 is suitably filled, then the pressure balance in the system will cause the filtered effluent to continue to pass through the outlet conduit 22, through the open valve 72, and out of the system. A Schrader valve 77 is provided on conduit 76 so as to facilitate pressure monitoring.

The outlet conduit 22 has the a normally closed solenoid-activated hydraulic valve 72 placed thereon. The valve 72 is controlled simultaneously with valve 62 by the action of the solenoid 70. A pressure line 73 extends from solenoid 70 to the valve 72. Similarly, a pressure line 75 extends from solenoid 70 to control valve 62. Since the valves 62 and 72 are hydraulic valves, the hydraulic pressure in the lines 73 and 75 closes the valves 62 and 72. When the hydraulic pressure is vented off, the valves 62 and 72 open simultaneously. When the pump 30 in the wastewater tank 26 is activated, then the normally closed valve 72 will open so as to allow the filtered effluent to pass through the system. When the pump 30 is turned off, the valve 72 will close (in conjunction with valve 62) so as to prevent the discharge from the captive air tank 20 from leaving the system.

When the valve 72 is in its open position, then the filtered effluent will pass along the outlet conduit 22 through a sand trap 80, through a pressure regulator 82, and through a flow meter 84. The sand trap 80 is essentially a screen filter system which is designed so as to cause any sand in the filtered effluent to fall into the chamber 86. A door 88 is provided on the end of the chamber 86 so as to allow for easy removal of any accumulated sand. The sand trap 80 allows the sand-filtered effluent to pass outwardly therefrom into the pressure regulator 82. In the preferred embodiment of the present invention, the pressure regulator 82 allows fluid pressures of over 40 p.s.i. to pass therethrough. The pressure regulator 82 essentially restricts the flow of the filtered effluent therethrough so as to allow the filtered effluent to accumulate in the captive air tank prior to passing from the system.

The flow meter 84 is removably affixed along the outlet conduit 22. Specifically, the flow meter 84 is attached by spools 90 and 92 to the outlet conduit 22. The flow meter 84 is designed so as to measure the flow of liquids therethrough. Since flow meters can be relatively expensive items, it is determined that the most cost-effective arrangement for the present invention is to make the flow meter 84 detachably connected along the conduit 22. In normal operation, the conduit 22 will simply extend outwardly to the drip field. A standard pipe section can be used by being in the area between spools 90 and 92. However, if it is necessary for diagnosis and analysis of the operation of the effluent management system 10 of the present invention, then the pipe between the spools 90 and 92 is removed and the flow meter 84 inserted thereon. After measurements are taken, then the flow meter 84 can be properly removed.

Similarly, an injector venturi valve 94 is removably attached along conduit 96 between spools 98 and 100. In normal operation, the injector venturi 94 will be replaced by a pipe extending between the spools 98 and 100. However, if it is necessary to field flush the drip irrigation system, then the injector venturi 94 can be inserted onto conduit 96. This allows chemicals to be injected into the flow of the filtered wastewater. Any chemicals that are injected into the system will pass into the drip irrigation field.

During the diagnosis, maintenance, and analysis of the effluent management system 10 of the present invention, it is often necessary to take pressure readings throughout the various components of the system. As such, Schrader valves 77, 102, 104, 106, and 107 are provided with the system. The Schrader valves 77, 102, 104, 106, and 107 resemble the valves on bicycle tires. This allows for the easy connection and disconnection of pressure measuring tools to the system. As such, if it is necessary to diagnose a particular problem in the present system, then these valves can be easily attached to the Schrader valves for the purposes of measurement. The use of the Schrader valves greatly enhances the ability to diagnose any problems that could occur within the system of the present invention. It should be noted that additional Schrader valves can be incorporated, as needed, into the flow lines of the present invention.

After the pump 30 in the wastewater treatment tank 26 has effectively pumped the pretreated wastewater from the tank 26, then the float switch 28 will be at a lower position. The lowering of the float switch 28 will send a signal to the solenoids 52 and 70 to open the valve 54, to close the valve 72, and to close the valve 62. Additionally, the pump 30 will be turned off so as to no longer pump any liquids from the interior of the wastewater tank 26. At this point in time, the captive air tank 20 will be, at least, partially filled with the filtered wastewater. When the valves are effectively closed, the pressure on the interior of the captive air tank 20 will forcibly cause the liquid therein to pass outwardly through the conduit 76 and into the conduit 22. This liquid will be blocked from passage to the drip field by the closed valve 72. The liquid from the captive air tank 20 will flow into the outlet 48 of the filter 18. This will cause the filter 18 to be effectively "backflushed". The backflushing operation will cause the accumulated filtered material to be dislodged from the fluidized sand within the filter 18. The backflushing will cause these particles to pass outwardly from the filter 18 through the inlet 42 and into the line 110. Since the valve 62 is closed and since the valve 54 is opened, the backflushed particles from the filter 18 will be flushed into the conduit 112. This material will pass through the conduit 112 and back into the pretreatment tank 14. As such, this filtered material can then be recirculated in the pretreatment tank for treatment in the standard aerobic manner.

After the filtered wastewater has passed from the outlet conduit 22, it can be delivered to the drip irrigation field 111. The drip irrigation field 111 is made up of a plurality of drip lines 113 which extend across an area of land. Each of the drip lines 113 has a plurality of apertures, holes, or slits formed therein so as to allow droplets of the filtered wastewater to pass therefrom. Typically, the drip tubing 113 is made of polyethylene and has a one-half inch diameter on two foot centers. Each of the drip tubing lines 113 is connected to a header line 115 at one end. A vacuum breaker 117 is provided on the end of the header line 115 so as to remove any vacuum occurring within the drip field system. At the other end of the drip tubing lines 113 is another header line 119. This header line can be removably affixed to the ends of the drip tubing lines 113 opposite the first header line 115. Another vacuum breaker 121 is provided on the second header line 119.

In certain circumstances, it is necessary to field flush the drip field 111. When this is necessary, the valve 52 will be in its closed position since the pump 30 is pumping the pretreated effluent into the filter 18 and outwardly through the outlet conduit 22. As a result, the valve 54 will also be closed so as to prevent any of the materials from the field flushing operation to pass into the wastewater tank 26 or into the filter 18. During the field flushing operation, the venturi injector 94 serves to receive chemicals for the scouring and flushing of the field. These chemicals will enter the filtered wastewater conduit 22 and will pass outwardly through the first header line 115, through the drip lines 113, and into the second header line 119. The chemicals which are used for the field flushing of the lines 113 should remove any flow restrictions in the drip lines 113. The field flushed materials will pass through line 114, through the open valve 116, and into the pretreatment line 112. This flushed material will then pass back into the pretreatment tank 14.

Under certain circumstances, it is desirable to manually backflush the filter 18. This is accomplished by the use of the hose connection 118 which is connected to the outlet 48 of the filter 18. The hose connection 118 is connected to line 122. Line 122 has a check valve 124 and a metering valve 126 thereon. The valves can then be opened so as to allow a flow of water from the hose connection 118 through the line 122 and into the outlet 48 of the filter 18. Since the manual backflushing operation will occur when the pump 30 is in its inactive state, the valve 72 will be normally closed, along with valve 62. Valve 54 will be open so as to allow the manually backflushed material to pass to the pretreatment tank 14.

The system 10 can use an optional chlorinator arrangement so as to provide for the disinfection of the effluent and the equipment. Effluent under pressure passes through a hydraulic valve and a metering valve 170 from the outlet conduit 22. The effluent, under pressure, will then enter the chlorinator 172. The chlorinator 172 has a chamber which receives a plurality of stacked chlorine tablets. The chlorinator 172 has a first inlet 174 and a second inlet 176. These inlets 174 and 176 receive separate flows of the effluent liquid. These inlet flows of the effluent interact with the chlorine tablets so as to easily and consistently dissolve the chlorine tablets, as the system would require. The dissolved chlorine will pass with the effluent liquid through the outlet 178 and into conduit 180. The chlorine solution will leave the chlorinator 172 via gravity flow to the pump tank 26 where the pump 30 will serve to distribute the solution through the system. A timer 181 can be connected by line 182 to the hydraulic valve 183. The timer 181 can be configured so as to control the hydraulic valve 183 for the purpose of providing intermittent operation.

The system 10 can also employ a filter backwash monitoring system. A pressure switch 184 is interconnected to conduit 36 from the wastewater tank 26. The pressure switch 184 is mounted in connection with the inlet side of the filter 18. Power is supplied to the pressure switch 184. Pressure switch 184 is also connected to the delay relay 56, to the float switch 28, to the pump 30, and to the solenoids 52 and 70. When the level in the wastewater tank 26 reaches a preset level, the solenoids 50 and 70 are engaged so that the system 10 becomes operational. If the filter 18 starts to plug, then the filter inlet pressure will increase. If pressure increases to the preset pressure switch set point, the contact switch will open and power will be interrupted to the pump 30 and to the solenoids 52 and 70. This will shut the pump 30 down and place the valves in the backwash position (described previously). When this happens, the pressure switch set point is satisfied so as to close its contacts. The delay relay 56 will prevent power from engaging the pump 30 and the solenoids 52 and 70 for a predetermined amount of time. During this time, the partially plugged filter 18 is backwashed. Shortly thereafter, the delay relay 56 allows power to proceed to the pump 30 and to the solenoids 52 and 70 so that the system's operation returns to normal. The monitoring system, as used in this optional embodiment, is only required in situations where the pretreatment effluent quality is poor. Normally, the filter 18 is backwashed at the end of every pump cycle. However, with this monitoring system, backwashing can occur between pump cycles, if necessary.

A high level alarm panel 185 can also be provided with the system 10. An alarm switch 186 is provided on the interior of the wastewater tank 26. The alarm switch 186 is positioned so as to detect the rise of the wastewater in the tank 26 above a predetermined level. When the wastewater reaches this level, then the alarm switch 186 will transmit a signal through line 187 to the alarm panel 185 so as to alert the user of the system 10 that a problem has occurred within the wastewater tank 26. Under normal circumstances, this alarm will only sound in the event that the biological process is upset in the pretreatment tank and that the solids carryover is severe enough to plug the filter 18. Under such circumstances, the level in the wastewater tank 26 will rise and engage the alarm switch 186 so as to activate an audible and/or visual alarm panel 185. The owner of the system will notify the service man of the problem. During the time between filter plugging and the repair, the pump 30 will continue to be protected by the use of the recycle line 60. A power supply 188 is 188 is connected to the level switch 28, and to the pump 30 so as to provide the necessary power to the system 10. A separate power supply circuit provides power to the alarm panel 185 and to the alarm switch 186.

The system 10 can also employ an optional dechlorinator 190. The dechlorinator 190 has a configuration similar to the chlorinator 172 (described herein previously). In normal use, just before the treated filtered chlorinated effluent leaves the system, a slipstream of the effluent is routed through line 191 through a metering valve 192 to the dechlorinator 190. As the slipstream through the line 191 passes through the inlets 193 and 194, the dechlorination tablets, within the interior of the dechlorinator 190, are dissolved. This solution then proceeds through the outlet 195 through conduit 196 where it joins with the chlorinated effluent so as to reduce or remove free and combined chlorine from the effluent. A contact tank 197 may be provided so as to cause this interaction. The chlorinated effluent can pass into the contact tank 197 through line 198 and metering valve 199. The treated filtered chlorinated, and dechlorinated, effluent can proceed by gravity flow to a direct discharge point from the contact tank 197.

Figure 2:
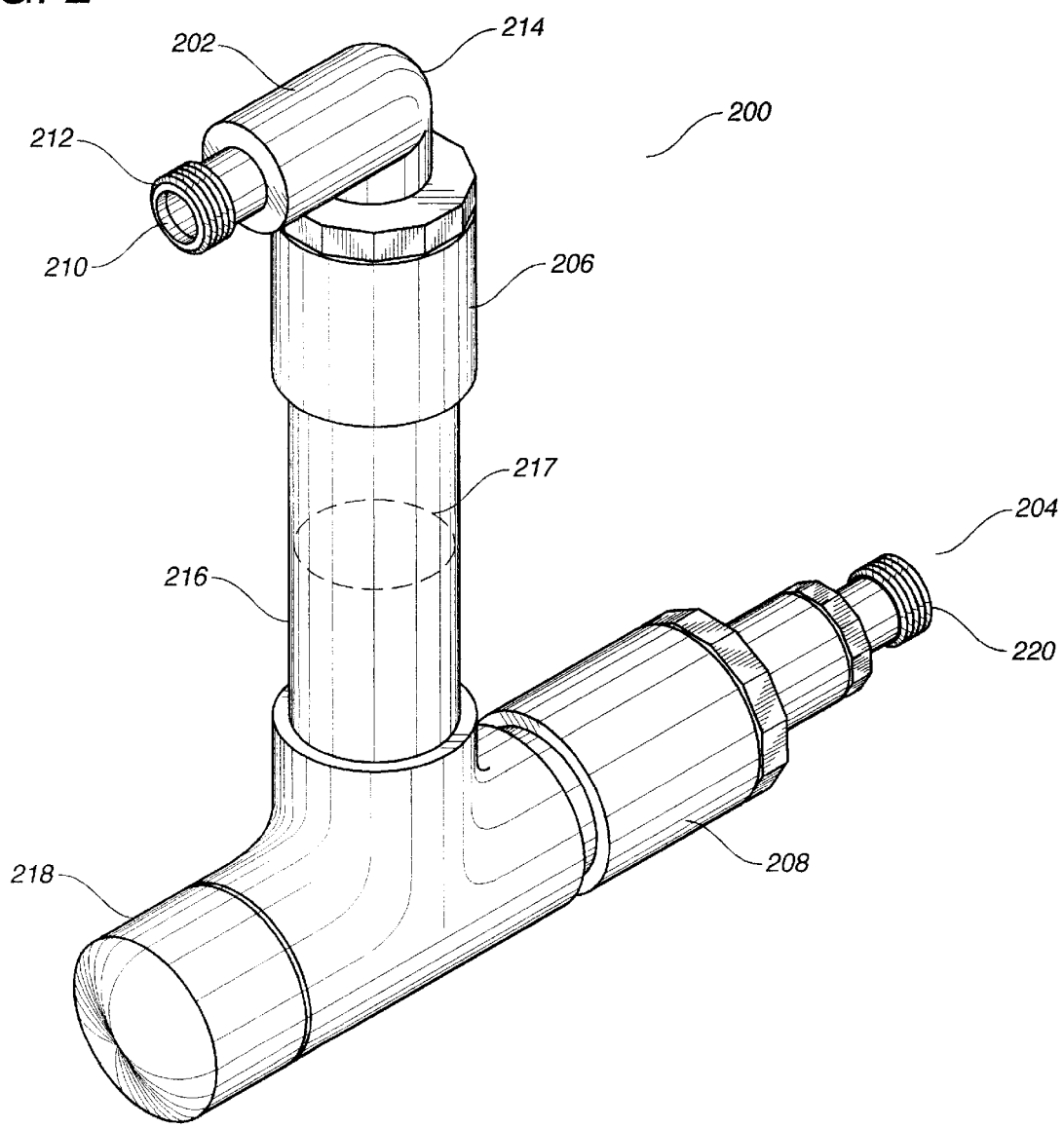
FIG. 2 is a perspective view of the sand filter of the preferred embodiment of the present invention.

FIG. 2 shows the sand filter 200 of the present invention. The sand filter 200 is utilized as filter 18 in the system 10 (described herein previously). The sand filter 200 includes a fluid inlet 202, a fluid outlet 204, a first body portion 206 connected to the fluid inlet 202 and a second body portion 208 connected to the fluid outlet 204. A filter support and particulate filter material is contained on the interior of the first body portion 206 and the second body portion 208.

The fluid inlet 202 includes a connector 210 which is suitable for connection to the line 110 (as illustrated in FIG. 1). The connector 210 has an external thread thereon which is suitable for receiving a pipe connected thereto. The connector 210 has an orifice 212 that allows the pretreated wastewater to be introduced therein. The pretreated wastewater will flow into the orifice 212 of the inlet 210 and into the interior of the sand filter 200. The inlet 202 includes an elbow portion 214 that allows the pretreated wastewater to flow downwardly through the first body portion 206.

The first body portion 206 is a cylindrical member that is fastened to the inlet 202. The cylindrical member 206 extends vertically upwardly from the second body portion 208. Importantly, a particulate filter material 216 extends upwardly for less than the height (or length) of the first body portion 206. The particulate filter material 216 is a sand or silica material. The silica material used as the particulate filter material 216 should have a density suitable for removing particles having a size of greater than 100 microns from the pretreated wastewater. After the pretreated wastewater passes into the orifice 212 of the connector 210, it will flow through the elbow 214 and downwardly so as to flow (or drip) onto the top surface 217 of the particulate filter material 216. It will then slowly flow through the grains of the silica material 216 and into the second body portion 208.

The first body portion 206 is in fluid communication with and extends transversely to the second body portion 208. The second body portion extends horizontally relative to the first body portion 206. The fluid outlet 204 is positioned at an end of the second body portion 208. As can be seen, the second body portion 208 has an end cap 218 affixed at an end opposite the fluid outlet 204. The interior of the second body portion 208 can be filled, at least partially, with the particulate filter material 216 (as will be described hereinafter). Eventually, the filtered wastewater will pass outwardly of the filter 200 through the outlet 204. The outlet 204 includes a threaded connector 220 that allows for connection to the outlet conduit 22 of the system 10 (as shown in FIG. 1).

During the backflushing operation, the filtered wastewater will pass into the outlet 204, through the interior of the second body portion 208, and will "bubble up" through the fluidized particulate material 216. This "bubbling up" effect serves to backflush the accumulated filtered material from the particulate material 216. The backflushed material will then flow outwardly through the inlet 202.

Figure 3:
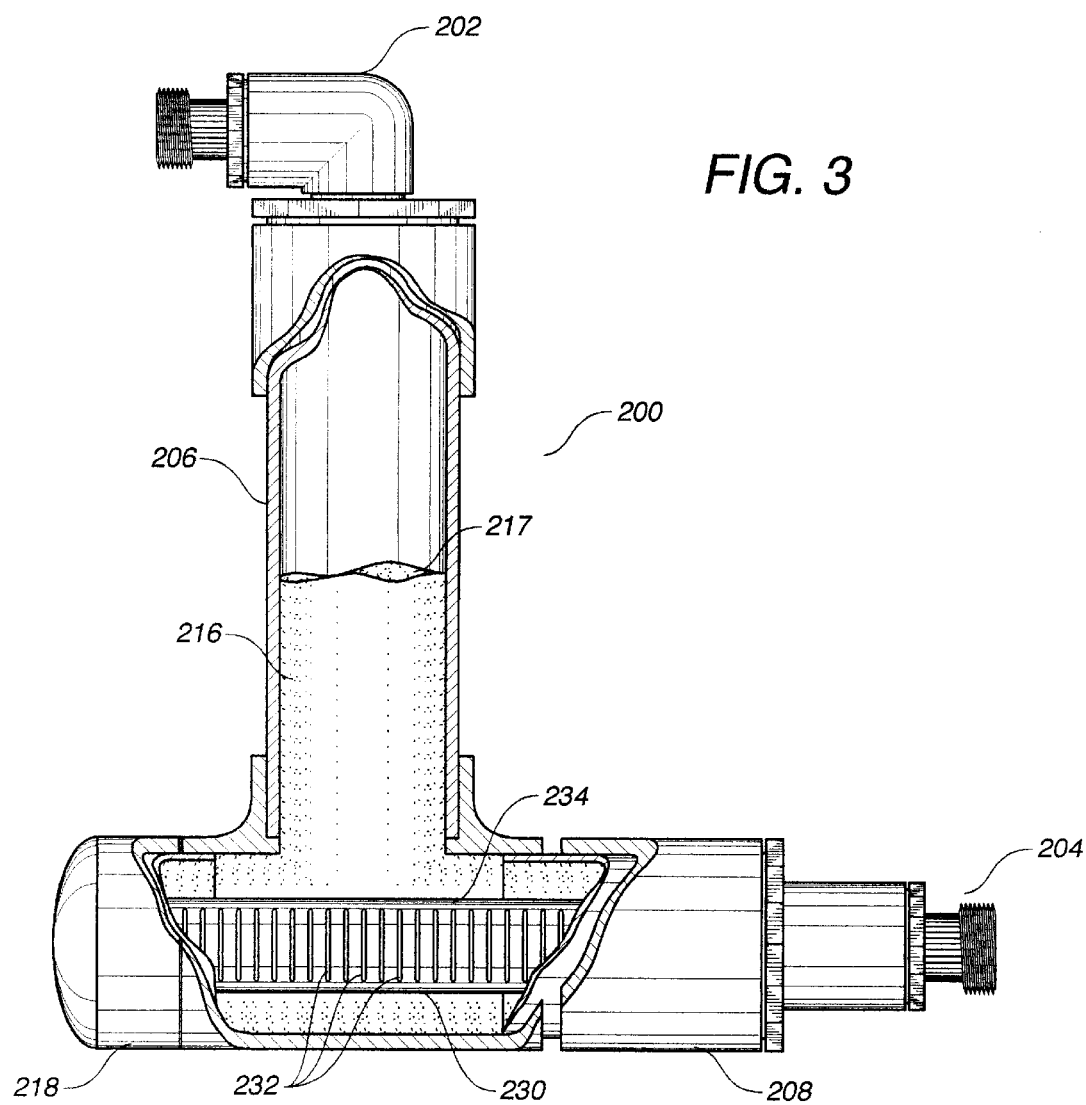
FIG. 3 is a cross-sectional view of the sand filter of the preferred embodiment of the present invention.

FIG. 3 shows a cross-sectional view of the sand filter 200 in accordance with the present invention. It can be seen that the sand filter 200 includes the inlet 202, the first body portion 206, the second body portion 208 and the outlet 204. In FIG. 3, it can be seen that the particulate material 216 extends upwardly to a top level 218. The particulate material 216 extends continuously between the interior of the first body portion 206 and the interior of the second body portion 208. A filter support 230 is disposed in the second body portion 208 between the first body portion 206 and the fluid outlet 204. As can be seen, this filter support has a plurality of openings 232 formed therein. The particulate material 216 will extend around the exterior of the filter support 230 so as to generally fill the interior of the second body portion 208. The filter support 230 is in fluid communication with the fluid outlet 204. The filter support 230 comprises a tubular member 234 extending from the fluid outlet 204 and through the interior of the second body portion 208. The openings 232 are slits which are formed in this tubular member. These slits 232 extend transversely to the longitudinal axis of the tubular member 234. Each of the slits 232 has a width less than the diameter of the particles of the particulate matter 216. It can be seen that the tubular member 234 has a length less than the length of the second body portion 208. The particulate filter material 216 fills the volume of the second body portion 208 exterior of the tubular member 232.

In normal use, the pretreated wastewater will flow into the inlet 202 and flow downwardly through the particulate filter material 216. Eventually, the pretreated wastewater will be filtered by passing through this silica material 216. The filtered wastewater will then flow into the slits 232 formed on the tubular member 234 of the filter support 230. It will then pass outwardly from the tubular member 234 through the outlet 204 of the second body portion 208. However, in the instance of backflushing, the filtered wastewater which is accumulated in the captive air tank 20 will flow into the outlet 204, through the slits 232 and upwardly through the sand 216 on the interior of the second body portion 208 and the first body portion 206. Since the sand 216 has a greater density than that of the water, the sand will be fluidized, but will remain within the confines of the first tubular member 206. The backflushed liquid will then pass outwardly through the inlet 202 of the sand filter 200.

Figure 4:
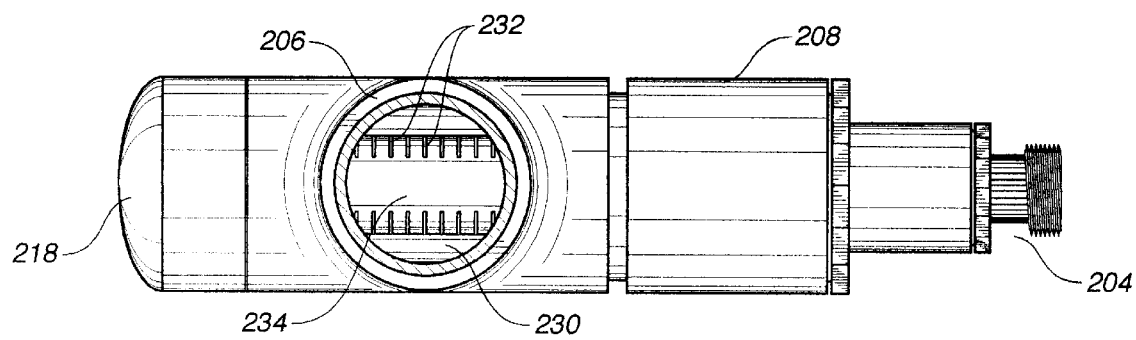
FIG. 4 is a cross-sectional plan view of the sand filter of the preferred embodiment of the present invention.

FIG. 4 shows a top view of the first body portion 206 as positioned on the second body portion 208. It can be seen that the filter support 230 extends longitudinally within the second body portion 208. The slits 232 are formed on the tubular member 234 and extend outwardly therefrom generally transverse to the longitudinal axis of the tubular member 234. The particulate material 216 will surround the tubular member 234 within the second body portion 208. It can be seen that both the first body portion 206 and the second body portion 208 have a generally cylindrical configuration. The first body portion 206 is positioned generally between the outlet 204 and the end cap 218 of the second body portion 208.

The inverted T-shaped configuration of the sand filter 200 of the present invention allows the tubular member 234 in the horizontal second body portion 208 (otherwise known as a "drain pan") to have a sufficient length so as to accommodate the flow rate requirements of the water within the system 10. If it is necessary to provide a relatively high flow rate, then the total surface area of the tubular member 234 can be extended so that the overall area of the openings on the tubular member 234 will be of sufficient cumulative area so as to accommodate this flow rate. In general, the flow of wastewater through the filter 200 of the present invention is limited by the overall area of the openings of the "filter support". In the embodiment of the sand filter as shown in FIGS. 2–4, the size of the total area of the openings on the tubular member 234 can be adapted for the flow requirements of the system. The power and pumping requirements for the backflushing of the sand 316 within the filter 200 of the present invention is only limited by the amount of sand contained within the vertical tubular member 206. As such, it is only necessary, upon the backflushing of the filter 200, to fluidize the sand 216 which is contained within the vertical portion. It is believed that the inverted T-shaped sand filter 200 of the preferred embodiment of the present invention is approximately four or five times more energy efficient in the backflush mode than a conventional cylindrically-shaped sand filter.

FIGS. 5–11 show various alternative embodiments of the sand filter of the present invention. In particular, in FIG. 5, it can be seen that the sand filter 300 includes a fluid inlet 302, a fluid outlet 304, a first body portion 306 connected to the fluid inlet 302, and a second body portion 308 connected to the fluid outlet 304. A flat filter support 310 is affixed within the second body portion 308 so as to extend across the interior of the second body portion 308. Particulate material 312 is contained on the interior of the second body portion 308 above the sand filter 310 and extends upwardly into the first body portion 306.

The fluid inlet 302 can be suitably connected to the line 110 (as illustrated in FIG. 1). The pretreated wastewater will flow through the inlet 302 into the interior of the sand filter 300. The inlet 302 includes an elbow portion 314 which allows the pretreated wastewater to flow downwardly through the first body portion 306.

The first body portion 306 is a tubular member that is fastened to the inlet 302. The first body portion 306 extends vertically upwardly from the second body portion 308. A tapered area 316 extends from the sides of the second body portion 308 and tapers upwardly and inwardly to the sides of the first body portion 306. The particulate filter material 312 extends upwardly for less than the height (or length) of the first body portion 306. After the pretreated wastewater passes into the first body portion 306, it will flow downwardly into the particulate filter material 312. It will then slowly flow through the grains of the silica material 312 and into the second body portion 308.

The fluid outlet 304 is positioned at the bottom of the second body portion 308. As can be seen, the filter support 310 is interposed between the particulate filter material 312 and the fluid outlet 304. The interior of the second body portion 308 is filled, at least partially, with the particulate filter material 312 above the surface of the filter support 310. Eventually, the filtered wastewater will pass through the filter support 310 and outwardly of the filter 300 through the outlet 304. The outlet 304 is suitable for connection to the outlet conduit 22 of the system 10 (as shown in FIG. 1).

Figure 5:
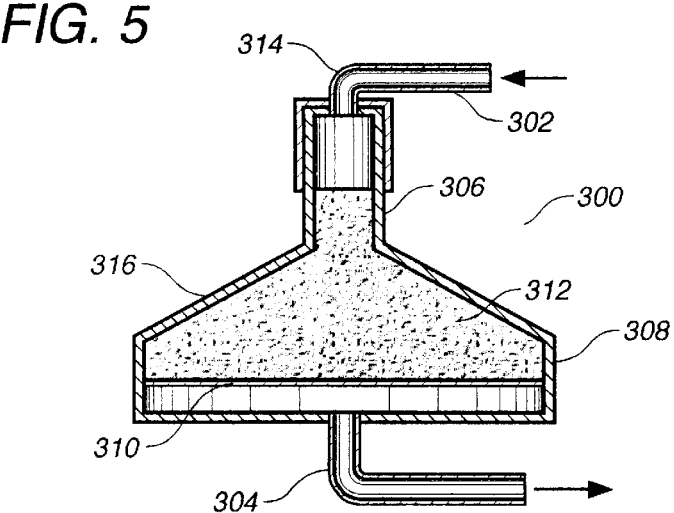
FIG. 5 is a cross-sectional view of a first alternative embodiment of the sand filter of the present invention.

Importantly, in the embodiment shown in FIG. 5, a total surface area of the openings in the filter support 310 will have a greater area than the cross-sectional area of the particulate filter material 312 found in the first body portion 306. As such, the embodiment of FIG. 5 fulfills the requirements of the present invention that the total surface area of the slits or openings in the filter support 310 is greater than the sand filtration surface area. As such, the embodiment of FIG. 5 serves to avoid hydraulic flow restriction therethrough during the backflushing operation. During the backflushing operation, the filtered wastewater will pass into the outlet 304, through the filter support 310, through the second body portion 308, and will "bubble up" through the fluidized particulate filter material 312. This "bubbling up" effect serves to backflush the accumulated filter material from the particulate filter material 312. The backflushed material will then flow outwardly through the inlet 302.

Figure 6:
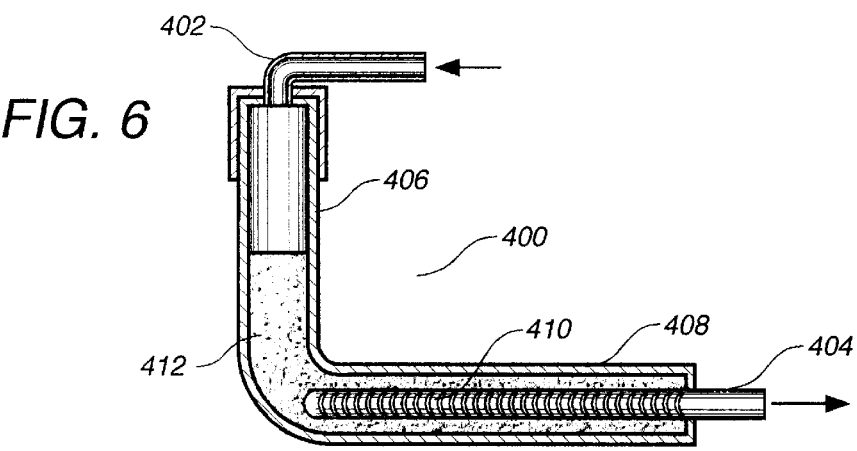
FIG. 6 is a cross-sectional view of a second alternative embodiment of the sand filter of the present invention.

FIG. 6 shows an alternative embodiment of sand filter 400 in accordance with the teachings of the present invention. The sand filter 400 includes a fluid inlet 402, a fluid outlet 404, a first body portion 406 connected to the fluid inlet 402, and a second body portion 408 connected to the fluid outlet 404. A filter support 410 extends through the interior of the second body portion 408. A particulate filter material 412 is contained on the interior of the first body portion 406 and the second body portion 408.

As can be seen in FIG. 6, the sand filter 400 in accordance with the teachings of the present invention has a generally L-shaped configuration. The first body portion 406 is connected with and communicates with an end of the second body portion 408. Initially, pretreated wastewater will flow into the interior of the first body portion 406 through the fluid inlet 402. Eventually, the pretreated wastewater will pass through the particulate filter material 412 and into the interior of the filter support 410. As such, the pretreated and filtered wastewater will pass outwardly from the sand filter 400 through the fluid outlet 404. Within the concept of the present invention, the fluid outlet 404 can be located at an end of the tubular filter support 410 extending outwardly of an end of the second body portion 408 or it can be positioned at any location along the length of the tubular filter support 410 and extend outwardly of the bottom of the second body portion 408. It is not a requirement of the present invention that the fluid outlet occur at an end of the tubular filter support.

The filter support 410 is in the form of a tubular member similar to that shown in the sand filter 200 of FIGS. 2–4. In the embodiment shown in FIG. 6, the total area of the slits formed on the tubular filter support 210 will be greater than the cross-sectional area in the a horizontal plane of the particulate filter material 412 found in the first body portion 406.

Figure 7:
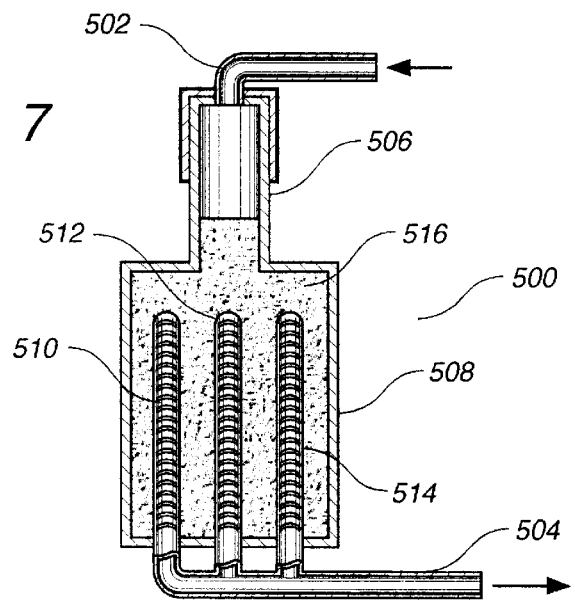
FIG. 7 is a cross-sectional view of a third alternative embodiment of the sand filter of the present invention.

FIG. 7 shows another alternative embodiment 500 of the sand filter of the present invention. The sand filter 500 includes a fluid inlet 502, and a fluid outlet 504, a first body portion 506 connected to the fluid inlet 502 and a second body portion 508 connected to the fluid outlet 504. A plurality of tubular filter supports 510, 512 and 514 reside within the interior of the second body portion 508. A particulate filter material 516 is contained on the interior of the first body portion 506 and the second body portion 508.

In FIG. 7, it can be seen that the filter supports 510, 512 and 514 have a tubular configuration which is similar, in design, to the tubular configuration of filter support 234 of FIGS. 2–4. However, the tubular filter supports 510, 512 and 514 extend vertically upwardly through the interior of the second body portion 508. Each of the filter supports 510, 512 and 514 communicate, at their lower ends, with the fluid outlet 504. In keeping with the teachings of the present invention, the sum total of the area of the slits formed on the filter supports 510, 512 and 514 will be greater than the cross-sectional area of the particulate filter material 516 found in the first body portion 506.

Figure 8:
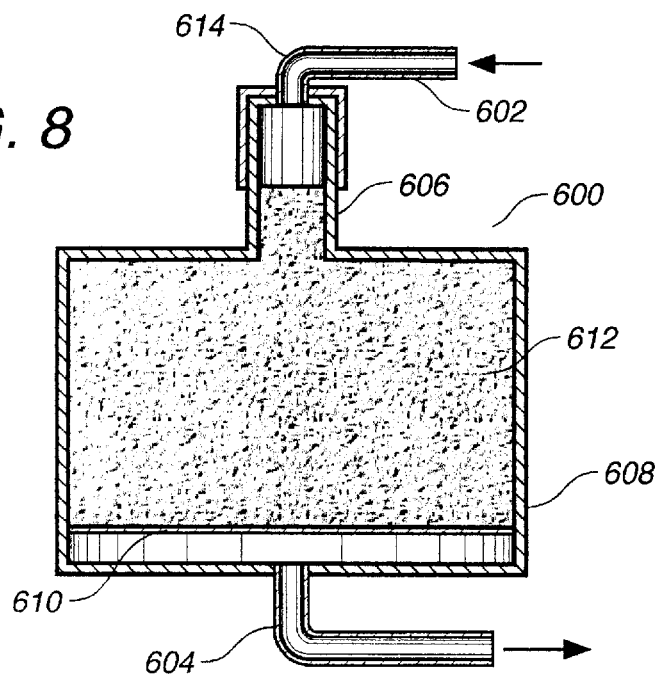
FIG. 8 is a cross-sectional view of a fourth alternative embodiment of the sand filter of the present invention.

FIG. 8 shows another alternative embodiment 600 of the sand filter of the present invention. The sand filter 600 includes a fluid inlet 602, a fluid outlet 604, a first body portion 606 which is connected to the fluid inlet 602, and a second body portion 608 which is connected to the fluid outlet 604. In the embodiment of FIG. 8, it can be seen that the second body portion 608 is shown as a relatively large vessel which can have a square or vat-like configuration. As such, it can be seen that the components of the present invention do not have to be round tubular items.

As can be seen in FIG. 8, a flat filter support 610 extends across the interior of the second body portion 608. The filter support 610 is interposed between particulate filter material 612 and the fluid outlet 604. The particulate filter material 612 extends through the interior of the second body portion 608 and into the interior of the first body portion 606. The fluid outlet 604 is fastened to the bottom of the second body portion 608 so as to allow filtered wastewater to pass outwardly therefrom. The operation of the sand filter 600, as shown in FIG. 8, is similar to the operation of the sand filter 300, as shown in FIG. 5.

Figure 9:
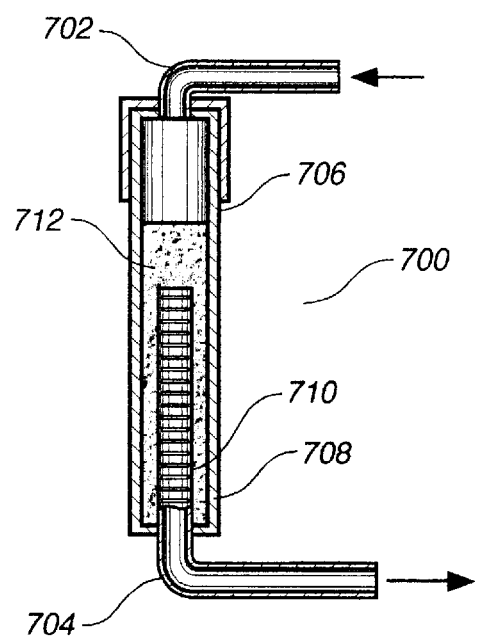
FIG. 9 is a cross-sectional view of a fifth alternative embodiment of the sand filter of the present invention.

FIG. 9 shows another alternative embodiment 700 of the sand filter of the present invention. The sand filter 700 includes a fluid inlet 702, a fluid outlet 704, a first body portion 706, and a second body portion 708. A tubular filter support 710 extends upwardly vertically through the interior of the second body portion 708. The tubular filter support 710 is connected to the fluid outlet 704 at the bottom of the second body portion 708. Particulate filter material 712 extends through the interior of the second body portion 708 and upwardly into the interior of the first body portion 706.

As can be seen in FIG. 9, the sand filter 700 has the first body portion 706 and the second body portion 708 in longitudinal alignment. As shown in FIG. 9, the first body portion 706 is integrally formed with the second body portion 708 in a tubular configuration. The fluid inlet 702 is connected to the top of the first body portion 706.

Importantly, as described herein previously, the sum total of the area of the slits of the tubular filter support 710 will be greater than the cross-sectional area, in a horizontal plane, of the particulate filter material 712 in the first body portion 706. As such, the sand filter 700 effectively avoids hydraulic flow restrictions in the backflush mode. The filter support 710 has a configuration similar to the tubular member 234 (as found in FIGS. 2–4), but for the fact that the filter support 710 extends upwardly vertically through the interior of the second body portion 708.

Figure 10:
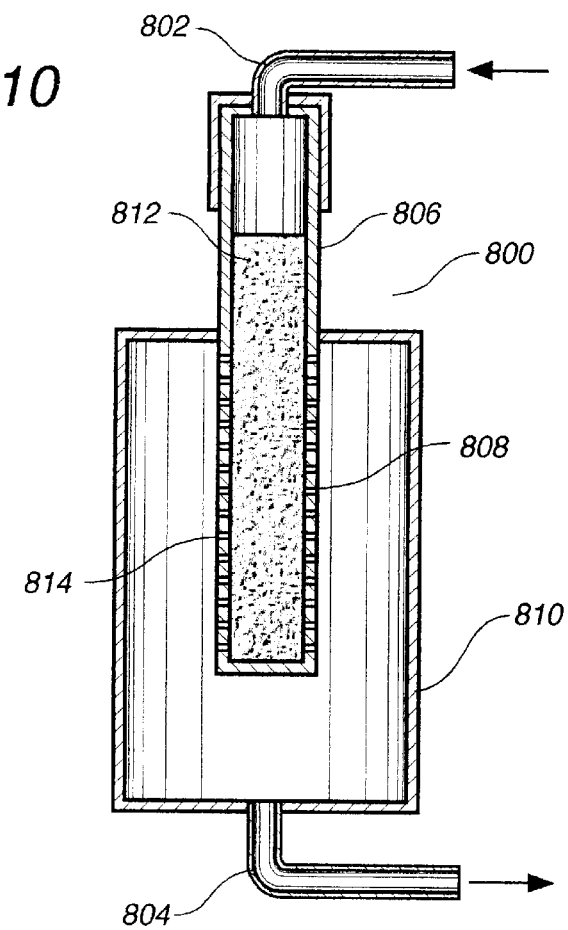
FIG. 10 is a cross-sectional view of a sixth alternative embodiment of the sand filter of the present invention.

Referring to FIG. 10, there is shown another alternative embodiment 800 of the sand filter of the present invention. The filter 800 includes an inlet 802, an outlet 804, a first body portion 806, a second body portion 808 and a vessel 810 surrounding the second body portion 808. As can be seen, in the embodiment of FIG. 10, the first body portion 806 and the second body portion 808 are formed on the same tubular member. The inlet 802 allows wastewater to flow into the interior of the first body portion 806. It can be seen that particulate filter material 812 fills the interior of the second body portion 808 and extends upwardly into the interior of the first body portion 806. The filter support 814 is formed on the exterior of the second body portion 808. As can be seen in FIG. 10, the filter support 814 comprises a plurality of slots formed on the surface of the second body portion 808.

During the filtering of the wastewater entering the inlet 802, the wastewater will flow into the interior of the first body portion 806 and through the particulate filter material 812. After filtering, the filtered wastewater will pass outwardly of the second body portion 808 through the slits of the filter support 814. This filtered wastewater will flow into the vessel 810 and outwardly of the filter 800 through the outlet 804. During the backflushing operation, the backflush liquid will pass into the outlet 804 so as to fill an interior of the vessel 810. The backflush water on the interior of the vessel 810 will enter the interior of the second body portion 808 through the slits in the filter support 814. This will cause the particulate filter material 812 to be fluidized so that the backflush material passes outwardly through the first body portion 806 and outwardly through the inlet 802. As can be seen, the wastewater filter of the present invention can function effectively if the sand is retained on the interior of the tubular filter support 804. It is also important to note that the slits which form the openings of the filter support 814 will have a total surface area which is greater than a cross-sectional horizontal surface area of the particulate filter material 812 in the first body portion 806.

Figure 11:
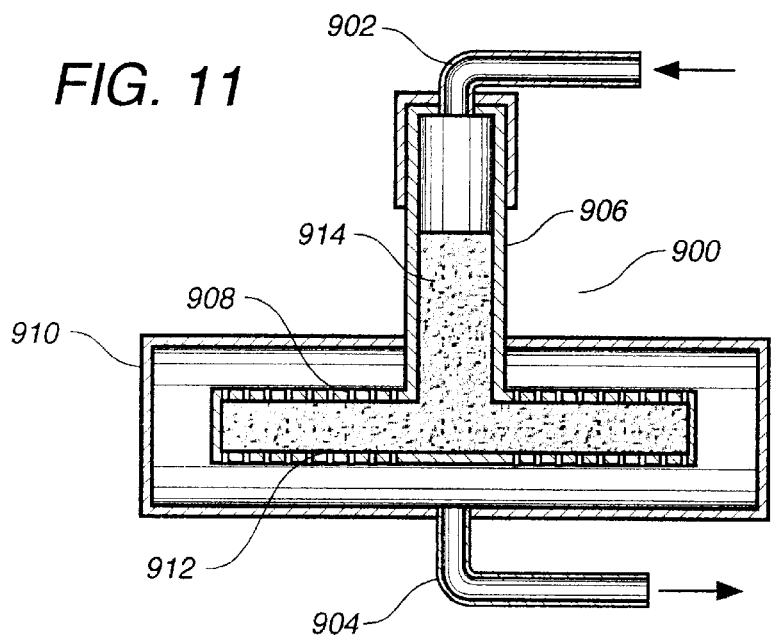
FIG. 11 is a cross-sectional view of a seventh alternative embodiment of the present invention.

FIG. 11 shows a further alternative embodiment 900 of the sand filter of the present invention. The sand filter 900 includes an inlet 902, an outlet 904, a first body portion 906 and a second body portion 908. A vessel surrounds the second body portion 908. The filter support 912 is formed on the exterior surface of the second body portion 908. As illustrated in FIG. 11, the filter support 912 includes a plurality of small holes or slits formed on the exterior surface of the second body portion 908. The particulate filter material 914 fills the interior of the second body portion 908 and extends upwardly into the first body portion 906.

During filtering operations, the wastewater will enter the inlet 902, flow through the first body portion 906, through the particulate filter material 914 in the second body portion 908 and outwardly through the openings in the filter support 912. The filtered wastewater will enter the housing 910 and flow outwardly of the wastewater filter 900 through the outlet 904. During backflushing operations, the backflush water will enter the interior of the vessel 910 through the outlet 904. As the vessel 910 becomes filled with the backflush water, the water will enter the openings in the filter support 912, flow through the particulate filter material 914 so as to fluidize the particulate filter material 914, and flow outwardly through the first body portion 906 and the inlet 902. FIG. 11 shows a variation of the embodiment of FIG. 10.

Each of the embodiments shown in FIGS. 5–11 effectively allows for the backflushing of the filtered wastewater. The use the relatively small sand filtration surface area relative to the area of the slits or openings of the filter supports serves to avoid hydraulic flow restrictions. Existing sand filters require 25 to 30% backflush water. This is prohibitive when used in a situation where backflush water discharge must be minimal, such as upstream of a wastewater treatment system. In the present invention, the sand filters (of FIGS. 2–11) disclose a system which requires much less backwash water for the effective flushing of the particulate filter material in the sand filters. As such, each of the filters of FIGS. 2–11 can be effectively incorporated into the effluent management system of FIG. 1.

The present invention has a large number of advantages not found in prior art systems. Most importantly, the present invention allows the wastewater effluent to be used for drip irrigation, spray irrigation, and/or for direct discharge. The use of the sand filter 200 essentially guarantees that any discharge from the system 10 will have particles of less than 100 microns in diameter. The present invention allows the commode water to be properly recycled and reutilized. The backflushing system of the present invention allows for the proper cleaning of the filter without accumulation. The problems associated with the prior use of screen and disk filters are solved by the present invention. Whereas the screen and disk filters would become clogged very often, the present invention effectively cleans the filter on every backflush operation. It is believed that sand filter is five times more effective for the removal of effluent particulates than screen and disk filters used on other systems. The present invention allows drip fields to effectively solve the problem of wastewater disposal on site. Since the wastewater is filtered, the drip lines will be free of clogging and accumulation of material. Even in the event of a clog or another problem, the present invention facilitates the ability to field flush the drip irrigation system. The present invention economically, efficiently, and effectively allows for the management of effluent from wastewater systems.

The foregoing disclosure and description of the invention is illustrative and explanatory thereof. Various changes in the details of the illustrated system, or the details of the illustrated configuration, may be made within the scope of the appended claims without departing from the true spirit of the invention. The present invention should only be limited by the following claims and their legal equivalents.

I claim:

1. A wastewater filter comprising:
   a fluid inlet;
   a fluid outlet;
   a first body portion connected to said fluid inlet;
   a second body portion connected to said first body portion;
   a filter support disposed in said second body portion between said first body portion and said fluid outlet, said filter support having a plurality of openings formed therein; and
   a particulate filter means filling an area between said second body portion and said filter support and extending into said first body portion, said particulate filter means for filtering wastewater passing therethrough, said plurality of openings having a total area greater than a cross-sectional area of said particulate filter means in said first body portion.

2. The filter of claim 1, said first body portion in communication with and extending transversely to said second body portion.

3. The filter of claim 2, said first body portion extending vertically above said second body portion, said second body portion extending horizontally, said fluid inlet positioned at an end of said first body portion, said fluid outlet positioned at an end of said second body portion.

4. The filter of claim 3, said particulate filter means extending for less than a height of said first body portion, said particulate filter means extending continuously from said second body portion to said first body portion, said cross-sectional area being in a horizontal plane across said first body portion.

5. The filter of claim 1, said filter support being a tubular member extending from said fluid outlet into said second body portion, said openings being slits formed in said tubular member.

6. The filter of claim 5, said slits being formed on said tubular member transverse to a longitudinal axis of said tubular member, each of said slits having a width less than a diameter of a particle of said particulate filter means.

7. The filter of claim 6, said tubular member having a length less than a length of said second body portion, said particulate filter means filling a volume of said second body portion exterior of said tubular member.

8. The filter of claim 5, said filter support comprising a tubular member extending vertically upwardly in said second body portion.

9. The filter of claim 8, said filter support comprising a plurality of tubular members extending vertically upwardly in said second body portion, each of said plurality of tubular members being in fluid communication with said fluid outlet.

10. The filter of claim 1, said particulate filter means being silica particles.

11. The filter of claim 1, said filter support being a flat horizontal screen extending across said second body portion.

12. A wastewater filter comprising:
    a body;
    a first opening formed at one end of said body;

a second opening formed at another end of said body;

a filter support disposed in said body adjacent said second opening, said filter support having a plurality of openings formed therein; and a particulate filter material filling a volume of said body exterior of said filter support, said particulate filter material extending toward said first opening, said plurality of openings of said filter support having a greater area than a cross-sectional area of said particulate filter material adjacent said first opening.

13. The filter of claim 12, said first opening being an inlet to said body, said second opening being an outlet from said body.

14. The filter of claim 13, said body having a vertical portion and a horizontal portion, said filter support being a tubular member extending from said outlet into said horizontal portion, said particulate filter material extending around said tubular member and into said vertical portion.

15. The filter of claim 14, said openings in said filter support being slits, said slits formed on an exterior surface of said tubular member transversely to a longitudinal axis of said tubular member, each of said slits having a width less than a diameter of a particle of said particulate filter material.

16. The filter of claim 12, said body having a base portion and an upper horizontal portion, said base portion having said second opening thereon, said upper horizontal portion having said first opening thereon, said particulate filter material extending from said base portion into said upper horizontal portion.

17. The filter of claim 16, said filter support comprising a flat screen extending horizontally across said base portion, said flat screen interposed between said particulate filter material and said second opening.

18. The filter of claim 16, said filter means comprising a tubular member extending vertically upwardly in said base portion, said tubular member extending from said second opening.

19. The filter of claim 18, said filter means comprising a plurality of tubular members extending in said base portion, each of said plurality of tubular members communicating with a fluid outlet.

20. The filter of claim 16, said upper horizontal portion having equal diameter as said base portion, said filter support comprising a tubular member extending vertically upwardly from said second opening.

21. A wastewater filter comprising:

a fluid inlet;

a fluid outlet;

a first body portion connected to said fluid inlet;

a second body portion connected to said first body portion, said second body portion having a plurality of openings formed therein;

a vessel generally surrounding said plurality of openings of said second body portion so as to form a fluid flow space between an inner surface of said vessel and said second body portion, said fluid outlet in fluid communication with said vessel;

a particulate filter means filling an interior of said second body portion and extending into said first body portion, said particulate filter means for filtering wastewater passing therethrough, said plurality of openings having a total area greater than a cross-sectional area of said particulate filter means in said first body portion.

22. The filter of claim 21, said first body portion being an upper volume and said second body portion being a lower volume of a vertical tubular member.

23. The filter of claim 21, said first body portion extending vertically above said second body portion, said second body portion extending horizontally, said fluid inlet positioned at an end of said first body portion.

24. The filter of claim 21, said particulate filter means extending for less than a height of said first body portion, said particulate filter means extending continuously from said second body portion to said first body portion, said cross-sectional area being in a horizontal plane across said first body portion.

\* \* \* \* \*